(12) United States Patent
Duan et al.

(10) Patent No.: US 11,587,515 B2
(45) Date of Patent: Feb. 21, 2023

(54) TERMINAL DEVICE (71) Applicant: VIVO MOBILE COMMUNICATION CO., LTD., Guangdong (CN)

(72) Inventors: Junjie Duan, Chang'an Dongguan (CN); Haijun Hou, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 16/766,241

(22) PCT Filed: Nov. 14, 2018

(86) PCT No.: PCT/CN2018/115391
§ 371 (c)(1),
(2) Date: May 21, 2020

(87) PCT Pub. No.: WO2019/100987
PCT Pub. Date: May 31, 2019

(65) Prior Publication Data
US 2020/0372863 A1    Nov. 26, 2020

(30) Foreign Application Priority Data
Nov. 22, 2017   (CN) .......................... 201711175798.3

(51) Int. Cl.
*H04M 1/72454*   (2021.01)
*G09G 3/34*   (2006.01)
*H04M 1/02*   (2006.01)

(52) U.S. Cl.
CPC ........ *G09G 3/3406* (2013.01); *H04M 1/0266* (2013.01); *H04M 1/72454* (2021.01);
(Continued)

(58) Field of Classification Search
CPC ........... H04M 1/72569; H04M 1/0266; H04M 1/026; H04M 1/72454; H04M 2250/12;
(Continued)

(56) References Cited

U.S. PATENT DOCUMENTS 5,765,934 A  *  6/1998  Okamori .............. G02B 6/0006
348/E5.144
2012/0229435 A1    9/2012  Hoshi et al.
(Continued)

FOREIGN PATENT DOCUMENTS

CN    102968223 A    3/2013
CN    203224455 U    10/2013
(Continued)

OTHER PUBLICATIONS

Chinese Office Action issued in corresponding application No. 201711175798.3, dated Feb. 3, 2019.
(Continued)

*Primary Examiner* — Temesghen Ghebretinsae
*Assistant Examiner* — Karin Kiyabu
(74) *Attorney, Agent, or Firm* — Maschoff Brennan (57) ABSTRACT

A terminal device mainly includes: a display module (21), a middle frame (22) for fixing the display module (21), a light-guiding column (23) embedded on the middle frame (22), and an ambient light sensor (24) located at bottom of the light-guiding column (23), wherein a light-entry surface of the light-guiding column (23) guides ambient light to the ambient light sensor (24).

20 Claims, 6 Drawing Sheets

(52) U.S. Cl.
CPC ............... *G09G 2320/0626* (2013.01); *G09G 2360/144* (2013.01)

(58) Field of Classification Search
CPC ..... G09G 2320/0626; G09G 2360/144; G09G 3/3406; G02B 6/00; G09F 9/00
See application file for complete search history.

(56) References Cited

U.S. PATENT DOCUMENTS

| | | | |
|---|---|---|---|
| 2013/0048837 A1* | 2/2013 | Pope | G01J 1/0407 250/214.1 |
| 2014/0166867 A1 | 6/2014 | Shiu et al. | |
| 2014/0183342 A1 | 7/2014 | Shedletsky et al. | |
| 2015/0221250 A1 | 8/2015 | Tada et al. | |
| 2016/0218156 A1 | 7/2016 | Shedletsky et al. | |
| 2020/0018885 A1* | 1/2020 | Wang | G02B 6/0036 |
| 2020/0310008 A1* | 10/2020 | Kim | H04M 1/0264 |
| 2020/0413516 A1 | 12/2020 | Grandclerc et al. | |

FOREIGN PATENT DOCUMENTS

| | | |
|---|---|---|
| CN | 203492123 U | 3/2014 |
| CN | 204665058 U | 9/2015 |
| CN | 106850898 A | 6/2017 |
| CN | 206389421 U | 8/2017 |
| CN | 107945661 A | 4/2018 |
| CN | 207530869 U | 6/2018 |
| WO | 2015125645 A1 | 8/2015 |
| WO | 2017186745 A1 | 11/2017 |

OTHER PUBLICATIONS

Chinese Office Action issued in corresponding application No. 201711175798.3, dated May 24, 2019.
PCT International Search Report and Written Opinion issued in corresponding application No. PCT/CN2018/115391, dated Jun. 4, 2020.
European Search Report in Application No. 18880702.8 dated Nov. 18, 2020.

* cited by examiner

TERMINAL DEVICE

CROSS-REFERENCE TO RELATED APPLICATION

The present application is the U.S. national phase of PCT Application No.PCT/CN2018/115391 filed on Nov. 14, 2018, which claims a priority to Chinese patent application No.201711175798.3 filed in China on Nov. 22, 2017, the disclosures of which are incorporated herein by reference in their entireties.

TECHNICAL FIELD

The present disclosure relates to the field of terminal technologies, in particular to a terminal device.

BACKGROUND

With the rapid development of electronic display devices such as intelligent mobile phones and the gradual rising of user requirements on the display performance of electronic products, the design of full screen (ultra-narrow bezel) has become a mainstream direction of the current research. However, in order to achieve the design of full screen, it needs to rearrange the elements on the display screen, thereby preventing such elements from occupying too much of the bezel.

Figure 1:
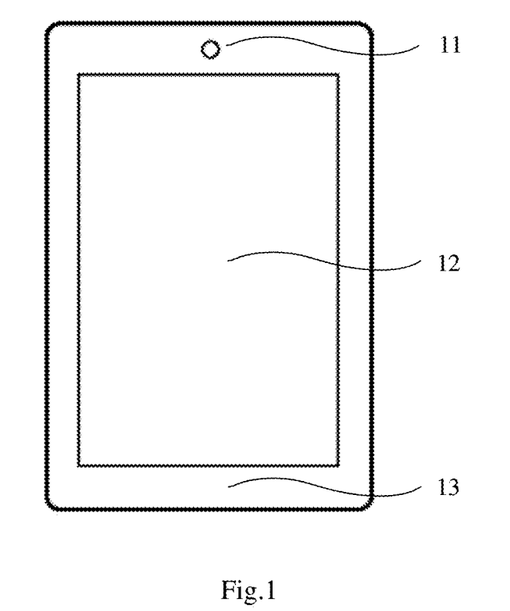
FIG. 1 is a structural schematic view of a terminal device in the related art.

In the related art, in terms of hardware, a main factor affecting the design of full screen is an ambient light sensor. Referring to FIG. 1, in the working environment, an ambient light sensor 11 detects the brightness of the ambient light in which the current display module 12 exists, and assists in adjusting the backlight brightness of the display module 12 according to a certain rule, thereby attaining the object of automatically regulating the backlight brightness according to the ambient light. In view of the rectilinear propagation feature of light, the light intensity sensed at different angles may be different. Therefore, in order to accurately simulate the detection of ambient light by human eyes, the ambient light sensor 11 usually needs to be arranged at the upper part of the front face of the display module (basically at a location aligned with the sight line of a user when using the electronic product) and must be located in the region of a cover plate 13, which requires that the cover plate 13 has a certain width for accommodating the ambient light sensor 11, thereby restricting the realization of full screen.

SUMMARY

The present disclosure provides a terminal device, which includes: a display module, a middle frame for fixing the display module, a light-guiding column embedded on the middle frame and an ambient light sensor located at bottom of the light-guiding column A light-entry surface of the light-guiding column guides ambient light to the ambient light sensor.

BRIEF DESCRIPTION OF THE DRAWINGS

The drawings illustrated herein are provided for further understanding the present disclosure and form a part of the present disclosure, and the schematic embodiments of the present disclosure and the illustrations thereof are used for explaining the present disclosure, rather than inappropriately limiting the present disclosure. In the drawings:

FIG. 4(a) and FIG. 4(b) are respectively schematic diagrams showing simulation of light reception of a light-guiding column;

DETAILED DESCRIPTION

In order to make the objects, technical solutions and advantages of the embodiments of the present disclosure more apparent, the technical solutions of the present disclosure will be described clearly and fully in conjunction with specific embodiments and corresponding drawings of the present disclosure. Apparently, the embodiments described are only a part of the embodiments of the present disclosure, rather than being all of the embodiments. All other embodiments obtained by one of ordinary skills in the art based on the embodiments in the present disclosure without creative work will pertain to the protection scope of the present disclosure.

In view of the problem of the related art that the layout of the ambient light sensor restricts the design of full screen, an embodiment of the present disclosure provides a terminal device.

It should be noted that, the present disclosure intends to put forward a design solution of a full screen terminal device having a specific light-guiding column structure, wherein by means of an irregular light-guiding column, the transmission path of external ambient light after entering the light-guiding column is controlled by designing the boundary of the light-guiding column (i.e., the light-entry surface, the light-exit surface and the reflection surface of the light-guiding column), thus the external ambient light is guided to the ambient light sensor (i.e., be sensed by a sensing area of the ambient light sensor) at a wide angle and in a high coupling degree, thereby achieving effectively sensitive; at the same time, the ambient light sensor is reasonably arranged through the light-guiding column to avoid occupying the bezel of the terminal device, which is favorable for the full screen design of the terminal device.

The technical solutions provided in each embodiment of the present disclosure will be illustrated in detail below in conjunction with the drawings.

Figure 2:
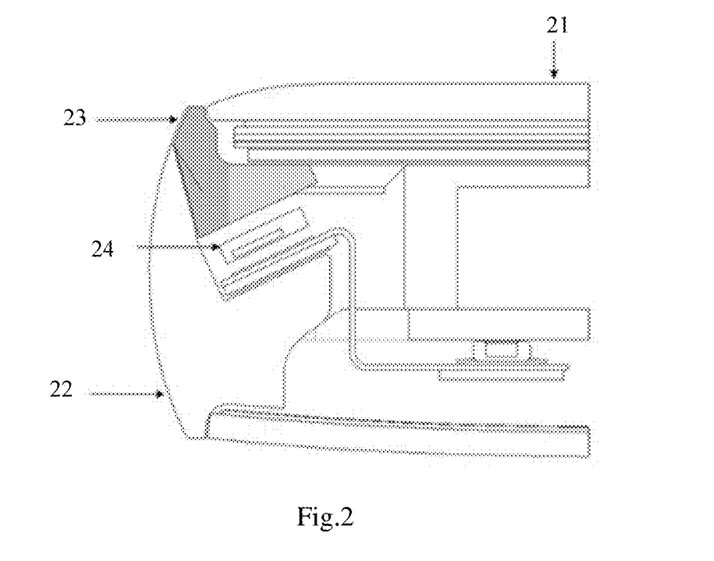
FIG. 2 is a sectional view showing a partial structure of a terminal device according to an embodiment of the present disclosure.

FIG. 2 is a sectional view showing a partial structure of a terminal device according to an embodiment of the present disclosure. In the sectional view, it mainly shows a component structure improved based on the ambient light sensor, wherein mainly includes: a display module 21, a middle frame 22 for fixing the display module 21, a light-guiding column 23 embedded on the middle frame 22, and an ambient light sensor 24 arranged at bottom of the light-guiding column 23; the light-entry surface of the light-guiding column 23 guides ambient light to the ambient light sensor 24.

The above display module 21 includes a screen and a cover plate covering the screen, and the cover plate may be a glass cover plate or a cover plate of another material. The light-guiding column 23 is embedded on the middle frame 22 and has an exposed small surface on the top as an incident surface, and the incident surface is located between the outer surface of the middle frame 22 and the outer surface of the display module. The ambient light sensor 24 is located at bottom of the light-guiding column 23, and the location of the ambient light sensor 24 should be designed for receiving the light to the greatest extent. Further, the external ambient light is guided to the ambient light sensor 24 by the light-guiding column 23 through a preset optical transmission path.

By the above technical solution, the light-guiding column is embedded on the middle frame, and the ambient light sensor is located at bottom of the light-guiding column. According to the principle of geometrical optics, the light-entry surface of the light-guiding column guides ambient light to the ambient light sensor. Therefore, the light-guiding column may achieve effectively sensitive without occupying the bezel of the terminal device; moreover, the screen-to-body ratio of the terminal device will not be affected, which is favorable for the full screen design of the terminal device.

Additionally, considering that the ambient light sensor is embedded on the middle frame in the present disclosure, no extra window needs to be printed, thus the problem of poor vision caused by a round hole window in the related art may be avoided; and at the same time, both the problem that the light-sensing performance of the ambient light sensor is affected by the light transmittance and haze caused by printing ink and the problem of inconsistent sensitivities caused by inconsistent colors during the ink printing may be avoided.

Figure 3:
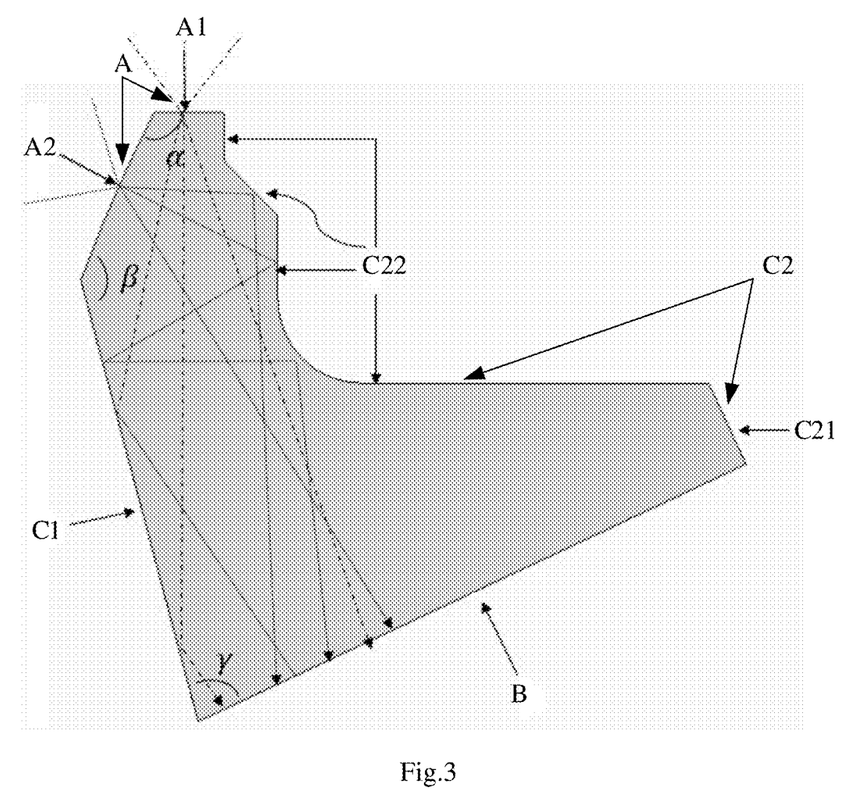
FIG. 3 is a structural schematic view of a light-guiding column according to an embodiment of the present disclosure.

Optionally, in the present disclosure, referring to FIG. 3, the light-guiding column 23 includes: a light-entry surface A located at the top, a light-exit surface B located at the bottom, a first reflection surface C1 connected with the middle frame 22, and a second reflection surface C2 opposite to the display module, wherein a part of the light entering via the light-entry surface A is reflected to the light-exit surface B by the first reflection surface C1 and the second reflection surface C2. The first reflection surface C1 is assembled to and connected to the middle frame 22, the second reflection surface C2 at least consists of a reflection surface C21 and a reflection surface C22 shown in FIG. 3, and the light-entry surface A and the light-exit surface B are transmission surfaces. The light-entry surface A is designed as a leveled surface for receiving ambient light and effectively coupling the ambient light into the light-guiding column; the first reflection surface C1 functions as the main light-guiding surface of the light inside the light-guiding column 23, and thus reflects the ambient light transmitted from the light-entry surface A to the light-exit surface B, and then the light escapes from the light-exit surface B and enters the ambient light sensor 24 parallel to the light-exit surface B.

By irregular light guiding, the ambient light is transmitted to a photosensitive area of the ambient light sensor through a preset path. After the light entering from the light-entry surface is refracted into the light-guiding column, reflected light is formed on the reflection surface, and incident light at different angles may finally reach the ambient light sensor located on the bottom of the light-guiding column via different reflections. The second reflection surface of the light-guiding column may meet the aesthetic design as required by the industrial design of the product and then match the optimal shape based on the design of the light-entry surface.

Optionally, in the present disclosure, still referring to FIG. 3, the light-entry surface A of the light-guiding column 23 includes a first light-entry surface A1 and a second light-entry surface A2 connected with each other, wherein the surface of the first light-entry surface A1 is parallel to the surface of the cover plate set at the top layer of the display module 21, the second light-entry surface A2 forms an angle relative to the first light-entry surface A1 and smoothly joins with the outer surface of the middle frame 22, thereby forming a smooth surface. Therefore, the light-guiding column 23 may simultaneously receive the light transmitted from a position above the terminal device obliquely and the light transmitted from the edge of the cover plate, thereby achieving a good light-receiving visual angle.

Optionally, in the present disclosure, the surface of the light-exit surface B is a textured surface, so that the light may escape and be easily sensed and detected by the ambient light sensor.

Optionally, in the present disclosure, still referring to FIG. 3, the second light-entry surface A2 and the first light-entry surface A1 form a first preset angle $\alpha$; the first reflection surface C1 and the second light-entry surface A2 form a second preset angle $\beta$; and the light-exit surface B and the first reflection surface C1 form a third preset angle $\gamma$. During practical designing, the value of each angle may be adjusted according to the detection precision of the ambient light sensor to achieve optimally and effectively sensitive.

Optionally, in the light-guiding column of the present disclosure, when the first preset angle $\alpha$ is 65°, the second preset angle $\beta$ is 145° and the third preset angle $\gamma$ is 80°, the ambient light collected by the light-guiding column has the highest efficiency.

Figure 4A:
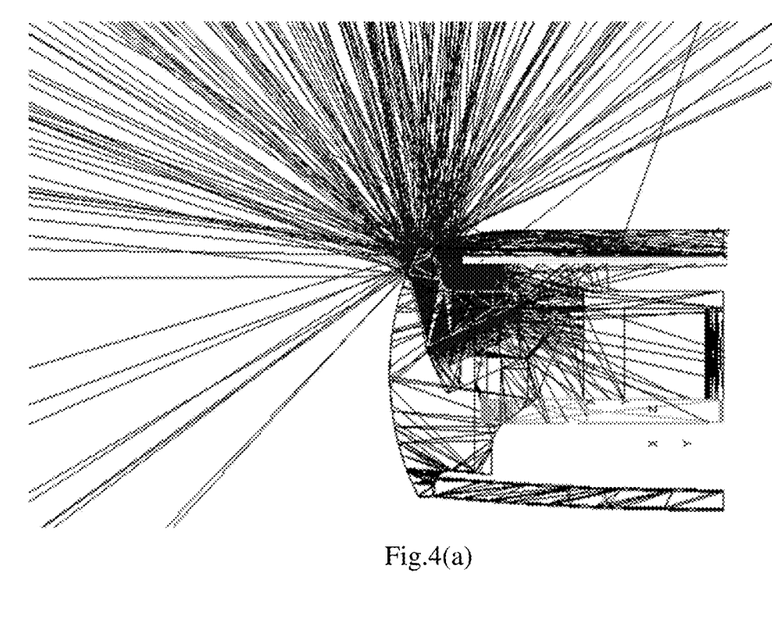

Further referring to the simulation diagram of FIG. 4(a) and FIG. 4(b), it may be seen that, under the premise that a large screen-to-body ratio on the front face is met, FIG. 4(a) simulates that ambient light is emitted onto the light-guiding column and guided to the ambient light sensor by the light-guiding column, and the ambient light from the front and top directions may also be sensed, and at the same time, the light-receiving visual angle may also be kept above 60°; FIG. 4(b) is a distribution diagram of light-receiving visual angle, wherein the abscissa refers to light angle, the ordinate refers to detected light intensity, and the light angle of the half-life period is 60°. Therefore, the light-receiving visual angle is determined as 60°, which is superior to the light-receiving visual angle in a range from 30° to 40° of the light guiding hole formed by printing as shown in FIG. 1.

In addition to optical design, the design of the irregular light-guiding column further includes structure design. The optical design part is mainly embodied as the matching of a transmission surface and a reflection surface in a typical light path, so that the ambient light entering from the incident surface at the top of the light-guiding column can reach the light-exit surface at the bottom portion of the light-guiding column. The structure design part is mainly embodied as the assembly design. Optionally, the light-guiding column is provided with a positioning part for positioning the middle frame. FIG. 5(a)-FIG. 5(d) are respectively a perspective view, a side view, a front view and a top view of the light-guiding column. It may be known by referring to the perspective view and the front view that, the light-guiding column is provided with a positioning part 51 for positioning the middle frame, and the positioning part 51 is specifically provided at a protruding bone position at the side edge of the light-guiding column to extend to the inside of the middle frame and cooperate with the middle frame for positioning; at the same time, the positioning part 51 may also have a supporting function.

Figure 5A:
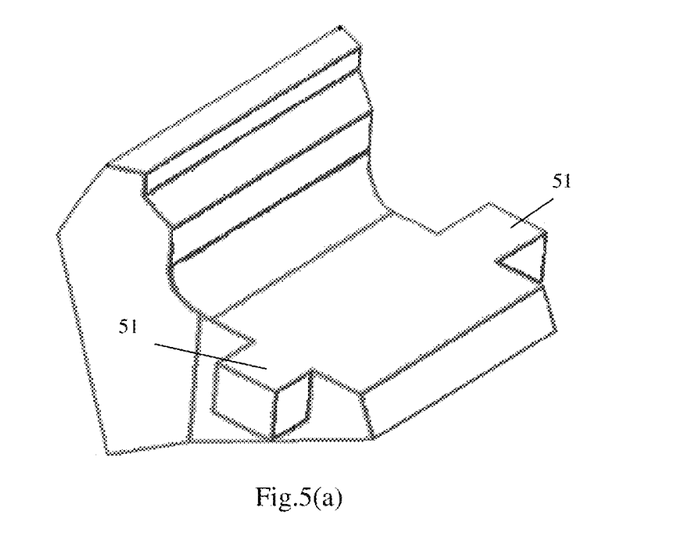
FIG. 5(a) is a perspective view of the structure of the light-guiding column related to the present disclosure.
Figure 5B:
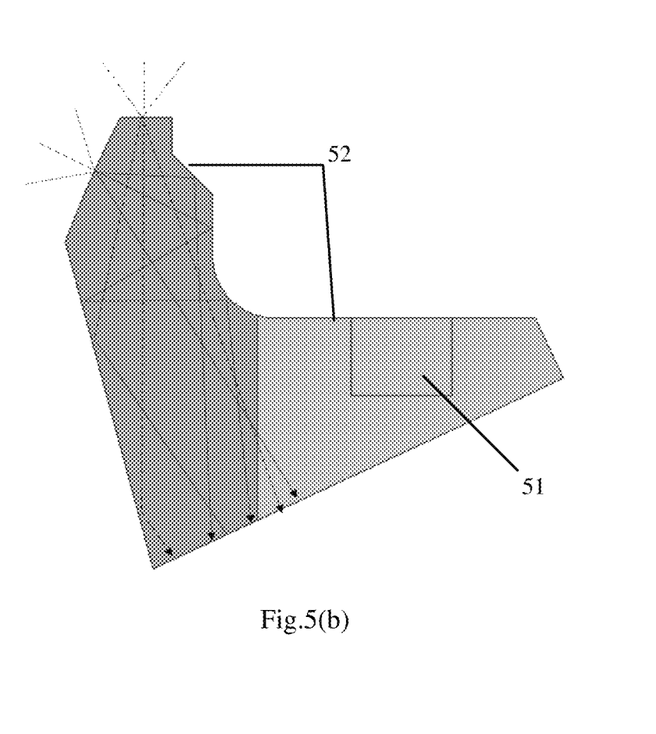
FIG. 5(b) is a side view of the structure of the light-guiding column related to the present disclosure.
Figure 5C:
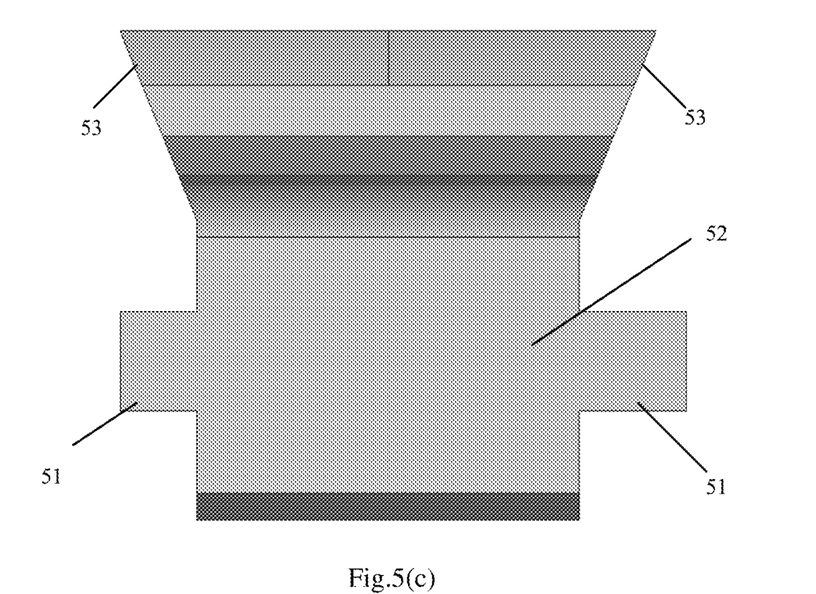
FIG. 5(c) is a front view of the structure of the light-guiding column related to the present disclosure.
Figure 5D:
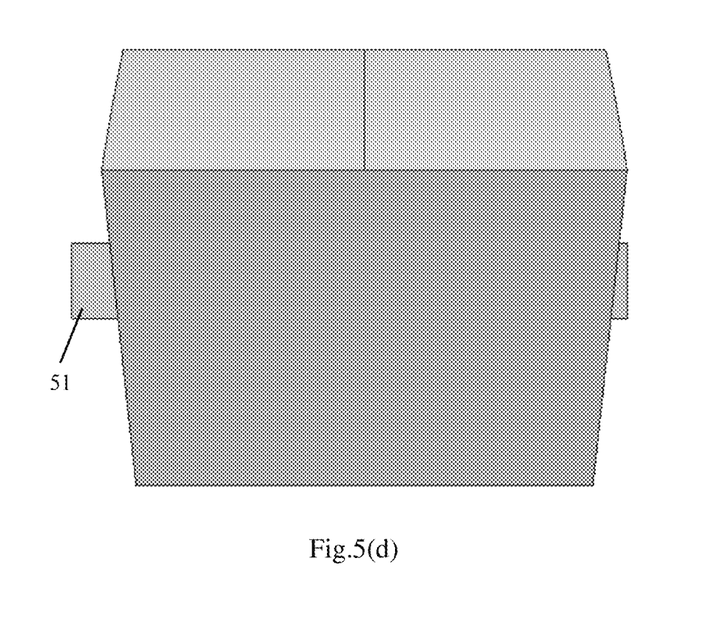
FIG. 5(d) is a top view of the structure of the light-guiding column related to the present disclosure.

Optionally, in the present disclosure, the second reflection surface of the light-guiding column forms a supporting surface for supporting the display module. It may be known by referring to the perspective view and the side view respectively shown in FIG. 5(*a*) and FIG. 5(*b*) that, the second reflection surface C2 of the light-guiding column not only reflects the incident light, but also forms a supporting surface 52 for supporting the display module; at the same time, it may be known by referring to FIG. 2 that, the supporting surface 52 may specifically include: a first supporting surface for contacting and supporting a display module, and a second supporting surface for supporting the cover plate.

It should be noted that, in the assembly design, the structure of the light-guiding column related to the present disclosure may include a positioning part 51, without providing a supporting surface; or, it may include a supporting surface 52, without providing a positioning part; or, it may include both a positioning part 51 and a supporting surface 52.

In the present disclosure, a supporting part 53 is provided at each of side walls near the right and left sides of the first reflection surface C1, and configured for supporting the middle frame in the right and left directions. Specifically, the supporting part 53 may be a wedge-shaped member.

Figure 6A:
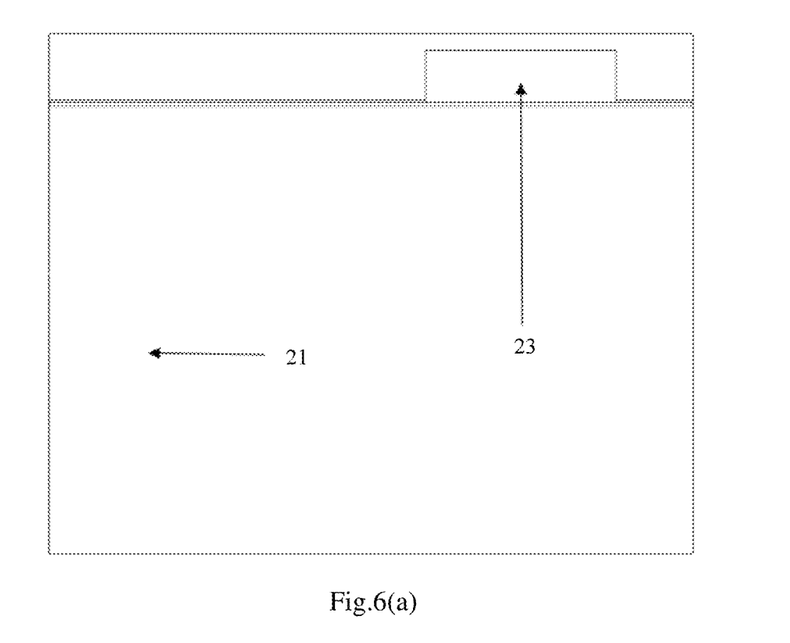
FIG. 6(a) is a front view showing assembly relation of the light-guiding column in a complete machine.
Figure 6B:
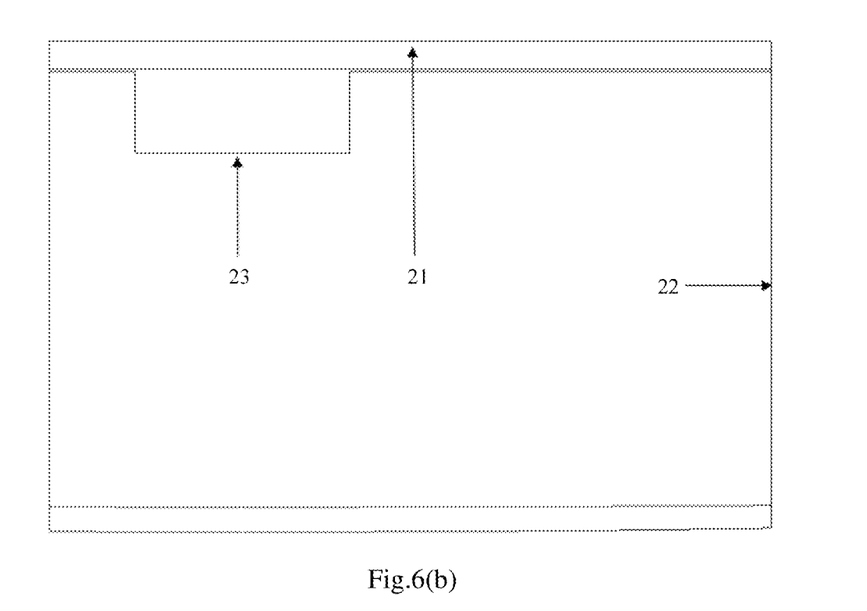
FIG. 6(b) is a top view showing the assembly relation of the light-guiding column in the complete machine.

Further, referring to FIG. 6(*a*)-FIG. 6(), FIG. 6(*a*)-FIG. 6(*b*) are schematic diagrams showing the assembly relation of the light-guiding column in the complete machine. It may be seen from the front view that, an exposed face (the first light-entry surface) of a part of the light-guiding column is arranged on the front face of the top middle frame for receiving the light transmitted from the front face of the terminal device. It may be seen from the top view that, an exposed face (the second light-entry surface) of a part of the light-guiding column is arranged at the top of the middle frame for receiving the light from the top side. In conjunction with the sectional view of a partial structure shown in FIG. 2, it may clearly see an assembly structure of the complete machine of the terminal device, wherein the middle frame 22 and the light-guiding column 23 are assembled with the wedge-shaped structure, and the light-guiding column cooperates and connects with other adjacent components via the positioning part, the supporting part and the supporting surface.

Optionally, in the present disclosure, the second reflection surface is provided with a shading layer. The shading layer covers the whole the second reflection surface; on one hand, it may reinforce the reflection of the light inside the light-guiding column, and on the other hand, it may prevent the light from being emitted from the second reflection surface to affect the normal display of the display module, and it may also prevent the light of the display module from affecting the ambient light sensor.

In the present disclosure, the material of the light-guiding column is a transparent macromolecular material. The light-guiding column is filled with an additive for controlling the transmissivity. Specifically, an acrylic material may be employed, and non-imaging optical diffusion may be achieved through surface treatment and internal toner filling, so that light at each angle may be sensed.

Additionally, the freedom of the optical control of the light guide column is superior to that in the method of spraying ink onto the glass cover plate in the related art, and it may achieve direct control on the transmittance, the refractive index and the spectral curve, etc., and may derive a more advanced application. The light-guiding column structure may be used in various optical lighting systems or light sensing systems.

The light-guiding column of the present disclosure may be independently embedded on the middle frame, or it may share a location with an antenna band on the middle frame to reduce the number of openings on the middle frame. The specific location of the light-guiding column on the side surface of the middle frame is not limited; preferably, it is located on the front side surface of the front face of display screen.

The terminal device concerned in the present disclosure mainly has an ultra-narrow bezel design to attain the object of full screen. The terminal device may be any product or component having a display function, for example, a mobile phone, a tablet computer, a television, a display, a notebook computer, a digital photo frame, a navigator or a smart wearable device. The other essential components of the terminal device should be understood by one of ordinary skills in the art, thus no repeated description will be given herein, and the present disclosure should not be limited thereto.

The above description only shows some embodiments of the present disclosure, rather than limiting the present disclosure. For one of ordinary skills in the art, the present disclosure may have various modifications and variations. Any modification, equivalent replacement, improvement, and the like made within the spirit and principle of the present disclosure should fall within the scope of the claims of the present disclosure.

What is claimed is:

1. A terminal device, comprising: a display module, a middle frame for fixing the display module, a light-guiding column embedded on the middle frame, and an ambient light sensor located at bottom of the light-guiding column,
   wherein a light-entry surface of the light-guiding column guides ambient light to the ambient light sensor;
   the light-guiding column comprises the light-entry surface arranged at top of the light-guiding column, a light-exit surface located at the bottom of the light-guiding column, a first reflection surface connected with the middle frame, and a second reflection surface opposite to the display module;
   a part of the light entering the light-guiding column through the light-entry surface is reflected to the light-exit surface by the first reflection surface and the second reflection surface;
   the light-entry surface of the light-guiding column consists of a first light-entry surface and a second light-entry surface connected with each other, a surface of the first light-entry surface is parallel to a surface of a cover plate set at a top layer of the display module, and the second light-entry surface forms an angle relative to the first light-entry surface, and smoothly joins with an outer surface of the middle frame;
   each of an entirety of the first light-entry surface and an entirety of the second light-entry surface is a part of an outer surface of the terminal device;

the first light-entry surface is a first flat surface, the second light-entry surface is a second plane flat surface, the first flat surface and the second flat surface are not in a same plane;

the second reflection surface consists of a third flat surface and a first surface, a first part of the first surface is a curved surface, a second part of the first surface is a fourth flat surface, the third flat surface joins the fourth flat surface at an obtuse angle;

an entirety of the first reflection surface is in direct physical contact with the middle frame.

2. The terminal device according to claim 1, wherein the second light-entry surface and the first light-entry surface form a first preset angle;

the first reflection surface and the second light-entry surface form a second preset angle; and the light-exit surface and the first reflection surface form a third preset angle.

3. The terminal device according to claim 2, wherein the first preset angle is 65°, the second preset angle is 145°, and the third preset angle is 80°.

4. The terminal device according to claim 3, wherein the second reflection surface of the light-guiding column forms a supporting surface for supporting the display module.

5. The terminal device according to claim 4, wherein the second reflection surface is provided with a shading layer.

6. The terminal device according to claim 3, wherein the light-exit surface is a textured surface.

7. The terminal device according to claim 3, wherein a material of the light-guiding column is a transparent macromolecular material.

8. The terminal device according to claim 2, wherein the second reflection surface of the light-guiding column forms a supporting surface for supporting the display module.

9. The terminal device according to claim 8, wherein the second reflection surface is provided with a shading layer.

10. The terminal device according to claim 2, wherein the light-exit surface is a textured surface.

11. The terminal device according to claim 2, wherein a material of the light-guiding column is a transparent macromolecular material.

12. The terminal device according to claim 1, wherein the light-guiding column is provided with a positioning part for positioning the middle frame.

13. The terminal device according to claim 12, wherein the second reflection surface of the light-guiding column forms a supporting surface for supporting the display module.

14. The terminal device according to claim 13, wherein the second reflection surface is provided with a shading layer.

15. The terminal device according to claim 12, wherein the light-exit surface is a textured surface.

16. The terminal device according to claim 12, wherein a material of the light-guiding column is a transparent macromolecular material.

17. The terminal device according to claim 1, wherein the second reflection surface of the light-guiding column forms a supporting surface for supporting the display module.

18. The terminal device according to claim 17, wherein the second reflection surface is provided with a shading layer.

19. The terminal device according to claim 1, wherein the light-exit surface is a textured surface.

20. The terminal device according to claim 1, wherein a material of the light-guiding column is a transparent macromolecular material.

* * * * *